(12) United States Patent
Pais et al.

(10) Patent No.: US 12,244,052 B2
(45) Date of Patent: Mar. 4, 2025

(54) COMMUNICATION DEVICE HAVING A HEAT SINK ANTENNA

(71) Applicant: MOTOROLA MOBILITY LLC, Chicago, IL (US)

(72) Inventors: Martin R. Pais, North Barrington, IL (US); Md Rashidul Islam, Lombard, IL (US); Hugh K. Smith, Palatine, IL (US)

(73) Assignee: Motorola Mobility LLC, Chicago, IL (US)

( * ) Notice: Subject to any disclaimer, the term of this patent is extended or adjusted under 35 U.S.C. 154(b) by 908 days.

(21) Appl. No.: 16/913,408

(22) Filed: Jun. 26, 2020

(65) Prior Publication Data

US 2021/0408658 A1   Dec. 30, 2021

(51) Int. Cl.
*H01Q 21/08* (2006.01)
*H01Q 1/00* (2006.01)
*H01Q 5/30* (2015.01)
*H01Q 7/00* (2006.01)
*H01Q 9/04* (2006.01)
(Continued)

(52) U.S. Cl.
CPC ............ *H01Q 1/002* (2013.01); *H01Q 5/30* (2015.01); *H01Q 7/00* (2013.01); *H01Q 9/0421* (2013.01); *H01Q 9/30* (2013.01); *H04W 88/06* (2013.01)

(58) Field of Classification Search
CPC .......... H01Q 1/002; H01Q 5/30; H01Q 7/00; H01Q 9/0421; H01Q 9/30; H01Q 5/378; H01Q 9/0407; H01Q 1/243; H01Q 3/24; H01Q 21/08; H01Q 1/02; H04W 88/06
See application file for complete search history.

(56) References Cited

U.S. PATENT DOCUMENTS 10,069,195 B1 * 9/2018 Asrani ................ H01Q 1/245
10,490,479 B1 * 11/2019 Wan .................... H01L 23/3128
(Continued)

FOREIGN PATENT DOCUMENTS

JP        2011211424 A  * 10/2011  .......... H01Q 1/2283

OTHER PUBLICATIONS

Casanova, Joaquin J., et al., Design of a 3-D Fractal Heatsink Antenna, IEEE Antennas and Wireless Propagation Letters, vol. 9, 2010.
(Continued)

*Primary Examiner* — Hai V Tran
*Assistant Examiner* — Bamidele A Immanuel
(74) *Attorney, Agent, or Firm* — Isidore PLLC

(57) ABSTRACT

A communication device, computer program product, and method provide a heat sink antenna that performs dual functions of thermal energy transferring and radio frequency (RF) communication. The communication device includes a millimeter wave (mmWave) antenna module. The communication device includes a heat sink antenna having a first portion in thermal conductive contact with at least a portion of a surface of the mmWave antenna module. The heat sink antenna has a second portion extending away from the first mmWave antenna module to transfer thermal energy away from the first mmWave antenna module. An RF front end of the communication device includes mmWave transmitter that radiates a mmWave signal via the mmWave antenna module, resulting in generation of the thermal energy.

19 Claims, 8 Drawing Sheets

(51) Int. Cl.
*H01Q 9/30* (2006.01)
*H04W 88/06* (2009.01)

(56) References Cited

U.S. PATENT DOCUMENTS

| | | | | |
|---|---|---|---|---|
| 10,833,424 B2* | 11/2020 | Ghaemi | | H01Q 1/273 |
| 2005/0006085 A1* | 1/2005 | Nelson | | G06F 1/206 |
| | | | | 165/300 |
| 2008/0024376 A1* | 1/2008 | Norris | | H01L 23/3672 |
| | | | | 257/E23.103 |
| 2008/0303121 A1* | 12/2008 | Lin | | H01L 23/3735 |
| | | | | 257/E23.079 |
| 2010/0277867 A1* | 11/2010 | Chen | | H01Q 17/001 |
| | | | | 361/699 |
| 2010/0327068 A1* | 12/2010 | Chen | | G06K 19/07749 |
| | | | | 235/492 |
| 2011/0032157 A1* | 2/2011 | Suh | | H01Q 9/42 |
| | | | | 343/702 |
| 2011/0075377 A1* | 3/2011 | Paquette | | H05K 7/20509 |
| | | | | 165/185 |
| 2011/0309980 A1* | 12/2011 | Ali | | H01Q 1/245 |
| | | | | 342/368 |
| 2012/0062422 A1* | 3/2012 | Wu | | H01Q 1/2258 |
| | | | | 342/368 |
| 2012/0282982 A1* | 11/2012 | Mujtaba | | H04W 52/0245 |
| | | | | 455/574 |
| 2014/0145899 A1* | 5/2014 | Yang | | H01Q 3/24 |
| | | | | 343/860 |
| 2015/0200444 A1* | 7/2015 | Mercer | | H01Q 1/243 |
| | | | | 29/601 |
| 2016/0049723 A1* | 2/2016 | Baks | | H01Q 9/0457 |
| | | | | 343/848 |
| 2016/0061983 A1* | 3/2016 | Heikura | | H01Q 1/243 |
| | | | | 324/207.15 |
| 2016/0118713 A1* | 4/2016 | Hong | | H01Q 9/0407 |
| | | | | 343/702 |
| 2016/0181857 A1* | 6/2016 | Konanur | | H04W 4/80 |
| | | | | 320/108 |
| 2016/0211881 A1* | 7/2016 | Kang | | H01Q 1/243 |
| 2017/0347490 A1* | 11/2017 | Romig | | H01Q 1/2283 |
| 2018/0159203 A1* | 6/2018 | Baks | | H01Q 21/065 |
| 2018/0205131 A1* | 7/2018 | Hwang | | H04M 1/026 |
| 2018/0301799 A1* | 10/2018 | Imai | | H01Q 1/24 |
| 2018/0316082 A1* | 11/2018 | Keller, III | | H01Q 1/247 |
| 2018/0343711 A1* | 11/2018 | Wixforth | | H01P 5/107 |
| 2019/0006731 A1* | 1/2019 | Chiu | | H01Q 21/065 |
| 2019/0103682 A1* | 4/2019 | Thai | | H01Q 21/064 |
| 2019/0131706 A1* | 5/2019 | Raney | | H05K 1/181 |
| 2019/0260127 A1* | 8/2019 | Shi | | H01Q 9/42 |
| 2020/0137740 A1* | 4/2020 | Lim | | H04B 17/318 |
| 2020/0137884 A1* | 4/2020 | Markish | | G01S 7/032 |
| 2020/0186203 A1* | 6/2020 | Kim | | H04B 7/024 |
| 2020/0203853 A1* | 6/2020 | Hu | | H01Q 21/28 |
| 2020/0358203 A1* | 11/2020 | Park | | H01Q 9/0414 |

OTHER PUBLICATIONS

Qian, Jiawei, et al., "Heatsink Antenna Array for Millimeter-Wave Applications", IEEE Transactions on Antennas and Propagation, 2020.

Covert, Lance et al., "Simulation and Measurement of a Heatsink Antenna: A Dual-Function Structure, IEEE Transactions on Antennas and Propagation", vol. 54, No. 4, Apr. 2006.

Oraon, Neha et al., "Self assembly based 3D heatsink antenna for high density 3D integration", Conference, 2013 International conference on Circuits, Controls and Communications (CCUBE), 2013.

\* cited by examiner

US 12,244,052 B2

COMMUNICATION DEVICE HAVING A HEAT SINK ANTENNA

1. TECHNICAL FIELD

The present disclosure relates generally to communication devices having antenna arrays, and more particularly to communication devices having heat mitigation for antenna arrays.

2. DESCRIPTION OF THE RELATED ART

Recent developments and standards for communication devices include use of higher communication bands that can support higher data rates. For example, the latest cellular service standard referred to as fifth generation new radio (5G NR) uses spectrum in the existing fourth generation long term evolved (4G LTE) standard in sub-6 GHz frequency range (600 MHz to 6 GHz). For higher data rates, 5G NR also uses spectrum in millimeter wave (mmWave) bands (24-86 GHz). The mmWave band assigned to 5G NR has short wavelengths of 1-10 mm that require placement of the antenna at or near the surface of the communication device for satisfactory antenna performance. At these frequencies, the individual antennas can be small and directional.

Antenna configurations in these communication devices are designed to accommodate multiple transmit and receive antennas to exploit multipath propagation, particularly in the mmWave bands for 5G NR. Generally, these 5G devices are implemented for higher data rates and faster communication performance and thus generate a heat load that is extensive. Being small and close to the surface, the 5G NR antenna configuration concentrates the heat load in a small area that can exceed user comfort levels for holding and using the communication device. If allowed to continue generating the heat load, the antenna modules can reach their thermal specification limits in a short amount of time, causing a need for some form of thermal mitigation or device shutdown.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION

Figure 1:
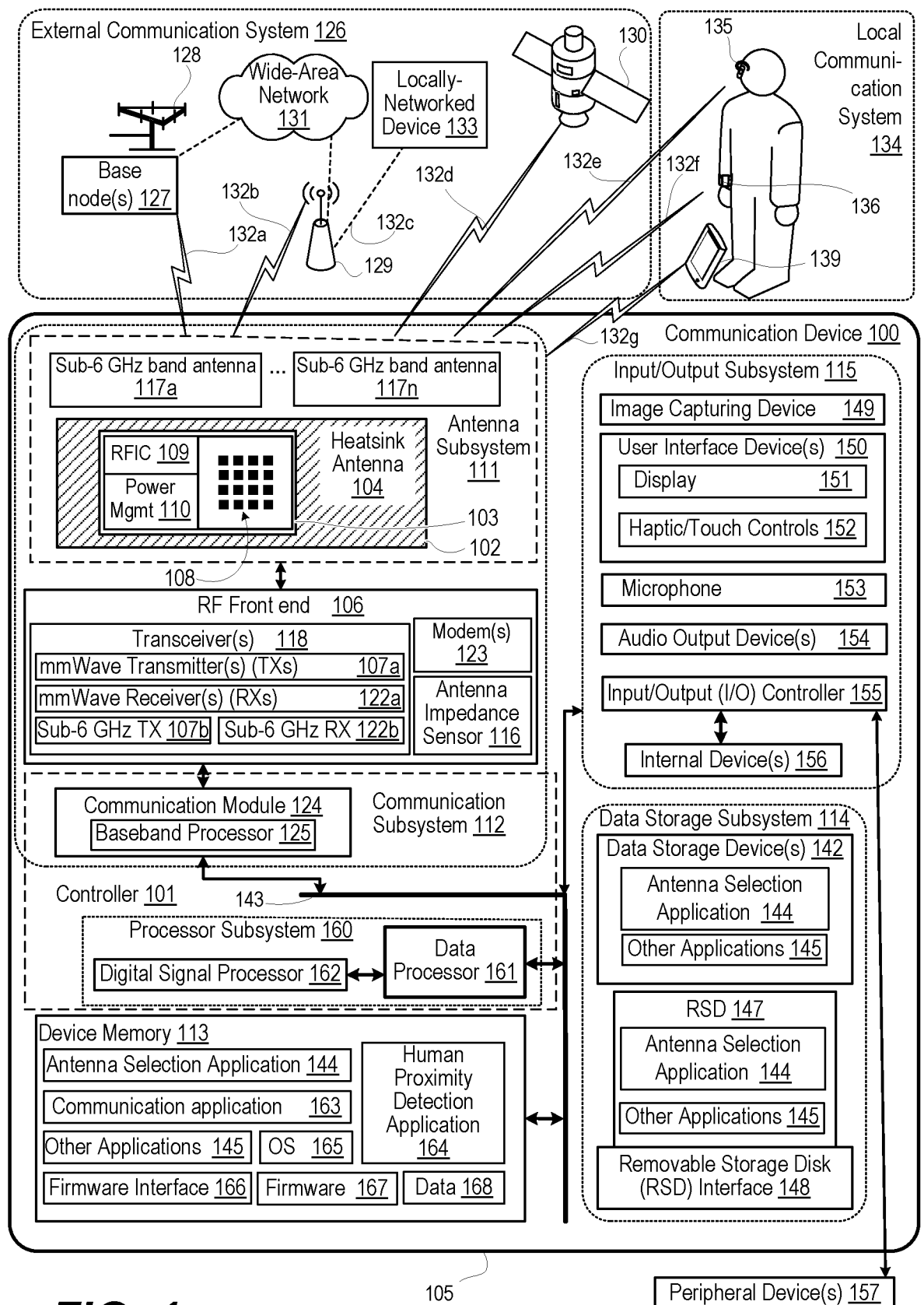
FIG. 1 is a functional block diagram of an electronic device that operates as a communication device in a communication environment and within which the features of the present disclosure are advantageously implemented, according to one or more embodiments.

According to aspects of the present disclosure, a communication device, computer program product, and method provide a heat sink antenna that performs dual functions of thermal energy transferring and radio frequency (RF) communication. The communication device includes a millimeter wave (mmWave) antenna module. The communication device includes a heat sink antenna having a first portion in thermal conductive contact with at least a portion of a surface of the mmWave antenna module. The heat sink antenna has a second portion extending away from the first mmWave antenna module to transfer thermal energy away from the first mmWave antenna module. An RF front end of the communication device includes a mmWave transmitter that radiates a mmWave signal via the mmWave antenna module, resulting in generation of the thermal energy. In one or more embodiments, the RF front end further includes a sub-6 GHz transmitter that radiates a sub-6 GHz signal via the heat sink antenna. In one or more particular embodiments, the communication device includes an impedance sensor communicatively coupled to a controller and that senses changes in impedance of the heat sink antenna. The controller disables transmission via the mmWave antenna module in response to detecting a proximity of a human, based on the change in impedance.

In the following detailed description of exemplary embodiments of the disclosure, specific exemplary embodiments in which the various aspects of the disclosure may be practiced are described in sufficient detail to enable those skilled in the art to practice the invention, and it is to be understood that other embodiments may be utilized and that logical, architectural, programmatic, mechanical, electrical and other changes may be made without departing from the spirit or scope of the present disclosure. The following detailed description is, therefore, not to be taken in a limiting sense, and the scope of the present disclosure is defined by the appended claims and equivalents thereof. Within the descriptions of the different views of the figures, similar elements are provided similar names and reference numerals as those of the previous figure(s). The specific numerals assigned to the elements are provided solely to aid in the description and are not meant to imply any limitations (structural or functional or otherwise) on the described embodiment. It will be appreciated that for simplicity and clarity of illustration, elements illustrated in the figures have not necessarily been drawn to scale. For example, the dimensions of some of the elements are exaggerated relative to other elements.

It is understood that the use of specific component, device and/or parameter names, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be given its broadest interpretation given the context in which that term is utilized.

As further described below, implementation of the functional features of the disclosure described herein is provided within processing devices and/or structures and can involve use of a combination of hardware, firmware, as well as several software-level constructs (e.g., program code and/or program instructions and/or pseudo-code) that execute to provide a specific utility for the device or a specific functional logic. The presented figures illustrate both hardware components and software and/or logic components.

Those of ordinary skill in the art will appreciate that the hardware components and basic configurations depicted in the figures may vary. The illustrative components are not intended to be exhaustive, but rather are representative to highlight essential components that are utilized to implement aspects of the described embodiments. For example, other devices/components may be used in addition to or in place of the hardware and/or firmware depicted. The depicted example is not meant to imply architectural or other limitations with respect to the presently described embodiments and/or the general invention. The description of the illustrative embodiments can be read in conjunction with the accompanying figures. Embodiments incorporating teachings of the present disclosure are shown and described with respect to the figures presented herein.

FIG. 1 is a functional block diagram of an electronic device in an operating environment within which the features of the present disclosure are advantageously implemented. In particular, the electronic device is presented as communication device 100, which is managed by controller 101.

While presented as communication device 100, it is appreciated that the features describe herein are fully applicable to other types of electronic devices, and that the presentation of communication device 100 is solely as an example and not meant to be limiting on the disclosure. Communication device 100 can be one of a host of different types of devices, including but not limited to, a mobile cellular phone, satellite phone, or smart-phone, a laptop, a net-book, an ultra-book, a networked smart watch or networked sports/exercise watch, and/or a tablet computing device or similar device that can include wireless communication functionality. As a device supporting wireless communication, communication device 100 can be utilized as, and also be referred to as, a system, device, subscriber unit, subscriber station, mobile station (MS), mobile, mobile device, remote station, remote terminal, user terminal, terminal, user agent, user device, a Session Initiation Protocol (SIP) phone, a wireless local loop (WLL) station, a personal digital assistant (PDA), computer workstation, a handheld device having wireless connection capability, a computing device, or other processing devices connected to a wireless modem.

Referring now to the specific component makeup and the associated functionality of the presented components. Communication device 100 incudes dual antenna assembly 102. Dual antenna assembly 102 includes mmWave antenna module 103 and heat sink antenna 104, which is in thermal conductive contact with at least a portion of a surface of mmWave antenna module 103 and extends away from mmWave antenna module 103 to transfer thermal energy away from mmWave antenna module 103. In one or more embodiments, the thermal energy transfer is at least in part conductive transfer within housing 105 of communication device 100. The thermal conduction spreads the thermal energy to a larger area within communication device 100 to avoid uncomfortable or damaging temperatures immediately around mmWave antenna module 103. In one or more embodiments, the thermal energy transfer is at least in part convective transfer away from housing 105. Heat sink antenna 104 has a portion close to the exterior surface of housing 105. Heat sink antenna 104 is convectively cooled, transferring the thermal load to the air external to housing 105. A radio frequency (RF) front end 106 includes mmWave transmitter 107a that radiates a mmWave signal via mmWave antenna module 103, resulting in generation of the thermal energy. The mmWave antenna module 103 of dual band antenna assembly 102 integrally includes patch antenna array 108, radio frequency integrated circuit (RFIC) 109, and power management system 110. Dual band antenna assembly 102 is part of antenna subsystem 111.

In one or more embodiments, communication device 100 includes communication subsystem 112, device memory 113, data storage subsystem 114, and input/output (I/O) subsystem 115. Each subsystem (112-115) is managed by controller 101. Communication subsystem 112 includes antenna subsystem 111. Antenna subsystem 111 includes one or more impedance sensors, such as antenna impedance sensor(s) 116, for detecting human proximity to a portion of antenna subsystem 111. Antenna impedance sensor (s) 116 can detect a change in one or more of capacitance and impedance that is indicative of the presence of a human body. In addition to dual band antenna assembly 102, antenna subsystem 111 includes sub-6 GHz antennas 117a-117n for communication in high frequency band (HB), IEEE 802.11 wireless bands, and 4G cellular bands.

Communication subsystem 112 also includes RF front end 106 having transceiver(s) 118 that includes mmWave transmitter(s) 107a, sub-6 GHz transmitter(s) 107b, mmWave receiver(s) 122a, and sub-6 GHz receiver(s) 122b. Sub-6 GHz transmitter(s) 107b and mmWave transmitter(s) 107a are collectively referred to herein as transmitter(s) 107. Sub-6 GHz receiver(s) 122b and mmWave receiver(s) 122a are collectively referred to herein as receiver(s) 122. RF front end 106 further includes modem(s) 123. Communication subsystem 112 includes communication module 124 having baseband processor 125. Baseband processor 125 communicates with controller 101 and RF front end 106. Baseband processor 125 operates in baseband frequency range to encode data for transmission and decode received data, according to a communication protocol. Modem(s) 123 modulate baseband encoded data from communication module 124 onto a carrier signal to provide a transmit signal that is amplified by transmitter(s) 107. Modem(s) 123 demodulates each signal received from external communication system 126 detected by antenna subsystem 111. The received signal is amplified and filtered by receiver(s) 122, which demodulate received encoded data from a received carrier signal.

In one or more embodiments, controller 101, via communication subsystem 112, performs multiple types of over-the-air (OTA) or wireless communication with external communication system 126. External communication system 126 can include devices such as base node(s) 127 elevated on respective radio tower(s) 128, access node(s) 129, and global positioning system (GPS) satellites 130. Some of these devices can be communicatively coupled to at least one wide area network 131. Communication subsystem 112 communicates via OTA communication channel(s) 132a with base node 127. Communication subsystem 112 communicates via wireless communication channel(s) 132b with access node 129. In one or more particular embodiments, access node 129 supports communication using one or more IEEE 802.11 wireless local area network (WLAN) protocols. Access node 129 is connected to wide area network 131, such as the Internet. In one or more particular embodiments, communication subsystem 112 communicates with one or more locally networked devices 133 via wired or wireless link 132c provided by access node 129. Communication subsystem 112 receives downlink broadcast channel(s) 132d from GPS satellites 130 to obtain geospatial location information.

In one or more embodiments, local communication system 134 includes wireless headset 135 and smart watch 136 that are coupled to communication device 100 to form a personal access network (PAN). Communication subsystem 112 communicates via low power wireless communication channel(s) 132e with headset 135. Communication subsystem 112 communicates via second low power wireless communication channel(s) 132f, such as Bluetooth, with smart watch 136. In one or more particular embodiments, communication subsystem 112 communicates with other communication device(s) 139 via wireless link 132g to form an ad hoc network.

Data storage subsystem 114 of communication device 100 includes data storage device(s) 142. Controller 101 is communicatively connected, via system interlink 143, to data storage device(s) 142. Data storage subsystem 114 provides nonvolatile storage that is accessible by controller 101. For example, data storage subsystem 114 can provide a selection of applications, such as antenna selection application 144 and other application(s) 145 that can be loaded into device memory 113. In one or more embodiments, data storage device(s) 142 can include hard disk drives (HDDs), optical disk drives, and/or solid-state drives (SSDs), etc. Data storage subsystem 114 of communication device 100 can include removable storage device(s) (RSD(s)) 147, which is received in RSD interface 148. Controller 101 is communicatively connected to RSD 147, via system interlink 143 and RSD interface 148. In one or more embodiments, RSD 147 is a non-transitory computer program product or computer readable storage device. Controller 101 can access RSD 147 or data storage device(s) 142 to provision communication device 100 with program code, such as antenna mode application 144 and other applications 145. When executed by controller 101, the program code causes or configures communication device 100 to provide the functionality described herein.

I/O subsystem 115 includes image capturing device 149, user interface device(s) 150 having one or more of displays 151, touch/haptic controls 152, microphone 153, and audio output device(s) 154. I/O subsystem 115 also includes I/O controller 155, which connects to internal devices 156 and peripheral devices 157 external to housing 105 of communication device 100.

Controller 101 includes processor subsystem 160, which includes one or more central processing units (CPUs), depicted as data processor 161. Processor subsystem 160 can include one or more digital signal processors 162 that are integrated with data processor 161 or are communicatively coupled to data processor 161, such as baseband processor 125. In one or embodiments that are not depicted, controller 101 can further include distributed processing and control components that are peripheral or remote to housing 105 or grouped with other components, such as I/O subsystem 115. Data processor 161 is communicatively coupled, via system interlink 143, to device memory 113. In one or more embodiments, controller 101 of communication device 100 is communicatively coupled via system interlink 143 to communication subsystem 112, data storage subsystem 114, and I/O subsystem 115. System interlink 143 represents internal components that facilitate internal communication by way of one or more shared or dedicated internal communication links, such as internal serial or parallel buses. As utilized herein, the term "communicatively coupled" means that information signals are transmissible through various interconnections, including wired and/or wireless links, between the components. The interconnections between the components can be direct interconnections that include conductive transmission media or may be indirect interconnections that include one or more intermediate electrical components. Although certain direct interconnections (system interlink 143) are illustrated in FIG. 1, it is to be understood that more, fewer, or different interconnections may be present in other embodiments.

Controller 101 manages, and in some instances directly controls, the various functions and/or operations of communication device 100. These functions and/or operations include, but are not limited to including, application data processing, communication with other electronic devices, navigation tasks, and signal processing. In one or more alternate embodiments, communication device 100 may use hardware component equivalents for application data processing and signal processing. For example, communication device 100 may use special purpose hardware, dedicated processors, general purpose computers, microprocessor-based computers, micro-controllers, optical computers, analog computers, dedicated processors and/or dedicated hard-wired logic.

Device memory 113 includes applications such as antenna selection application 144, communication application 163, human proximity detection application 164, and other application(s) 145. Device memory 113 further includes operating system (OS) 165, firmware interface 166, such as basic input/output system (BIOS) or Uniform Extensible Firmware Interface (UEFI), and firmware 167. Device memory 113 includes data 168 used by antenna mode application 144, communication application 163, and other application(s) 145. Processor subsystem 160 of controller 101 executes program code to provide operating functionality of communication device 100. These software and/or firmware modules have varying functionality when their corresponding program code is executed by processor subsystem 160 or secondary processing devices within communication device 100. Processor subsystem 160 of controller 101 can execute program code of antenna mode application 144 to configure antenna subsystem 111 based on execution of human proximity detection application 164. The mmWave antenna module 104 is small and shadowed only when a human is less than 1 cm away, Close proximity of heat sink antenna 104 to mmWave antenna module 103 enables accurate detection of human proximity.

Figure 2:
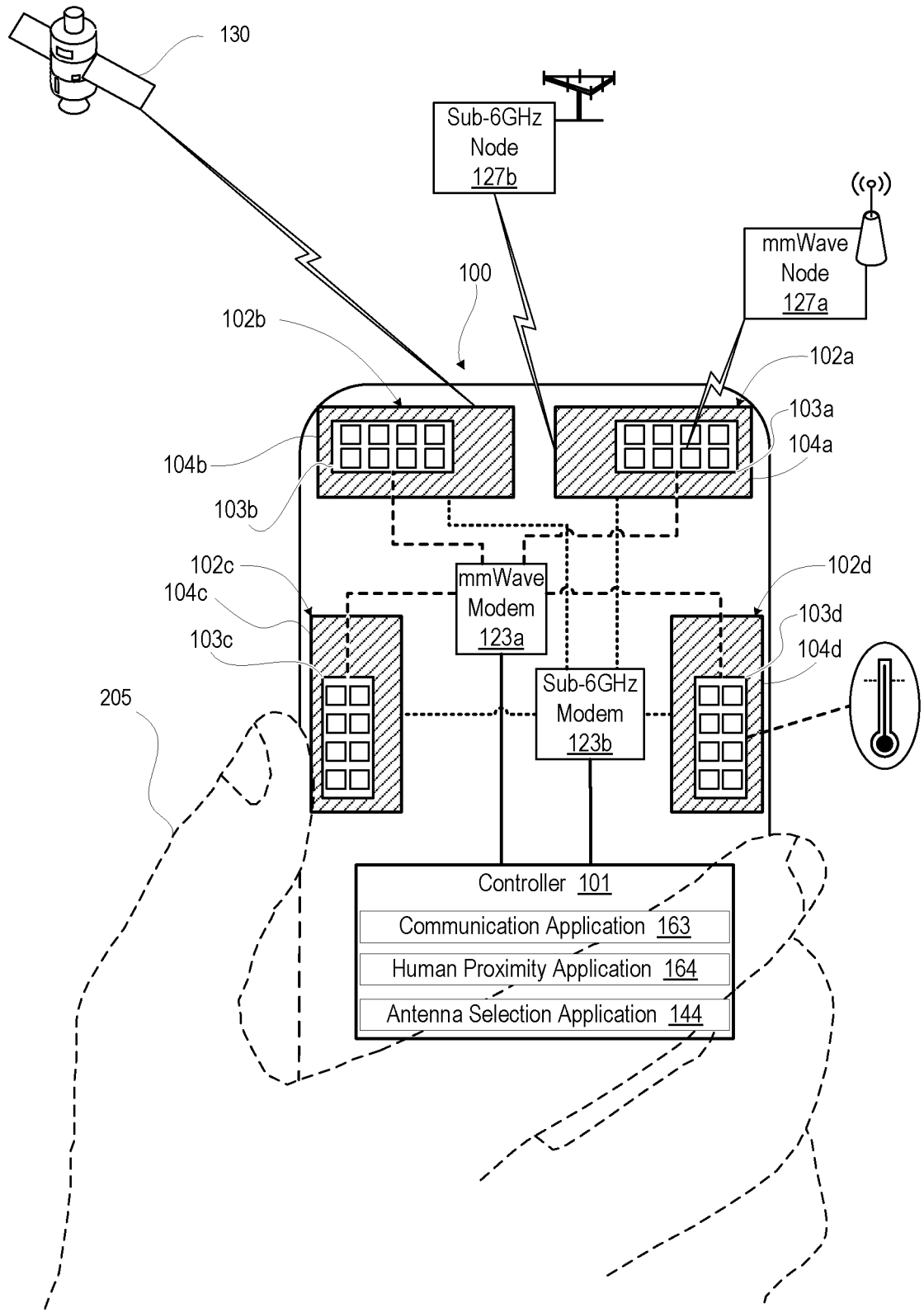
FIG. 2 is an antenna configuration diagram of four dual band antenna assemblies managed by a controller based on temperature and antenna blocking, according to one or more embodiments.

FIG. 2 depicts an antenna configuration diagram of communication device 100 having four dual band antenna assemblies 102a-102d that are selected for operation by controller 101 based on temperature and detection of antenna blocking. Controller 101 is communicatively coupled to mmWave modem 123a, which switches to one or more available mmWave antenna modules 103a-103d, respectively, of dual band antenna assemblies 102a-102d to support mmWave communication. Controller 101 is communicatively coupled to sub-6 GHz modem 123b, which switches to one or more available sub-6 GHz antenna modules 104a-104d, respectively, of dual band antenna assemblies 102a-102d to support sub-6 GHz communication. Controller 101 executes communication application 163, which enables communication device 100 to generate or consume communication data via mmWave and sub-6 GHz modems 123a-123b. For example, mmWave antenna module 103a transmits uplink 201 to mmWave node 127a.

In the presented embodiment, in addition to transferring thermal energy away from mmWave antenna module 103a, sub-6 GHz heat sink antenna 104b communicates with sub-6 GHz node 127b. Sub-6 GHz heat sink antenna 104b is being used to receive broadcasts 203 from GPS satellites 130. Corresponding mmWave antenna module 103b of dual band antenna assembly 102b is not active. Controller 101 executes human proximity application 164, which configures communication device 100 to avoid ineffective attempts to communicate via a blocked or shadowed mmWave antenna module 103c. Controller 101 utilizes sub-6 GHz heat sink antenna 104c of dual band antenna assembly 102c to detect proximity of person 205. Controller 101 executes antenna selection application 144, which tracks available and unavailable dual band antenna assemblies 102a-102d. Availability of a particular dual band antenna assemblies 102a-102d includes in part being appropriate for the communication band and direction to the communication target. A particular dual band antenna assemblies 102a-102d can be unavailable due to over-temperature or shadowing/blocking. Each mmWave antenna module 103a-103d performs thermal management, which involves reporting their temperature to controller 101 and shutting themselves off if the temperature poses a risk of damaging the respective mmWave antenna module 103a-103d. Controller 101 and mmWave modem 172a either anticipate an impending over-temperature condition or react to shutdown of particular mmWave antenna module 103d by switching active communication to another mmWave antenna module 103a-103b. In one or more embodiments, controller 101 implements a lower temperature threshold than the threshold utilized by mmWave antenna modules 103a-103d in order to maintain a comfortable touch temperature.

Figure 3:
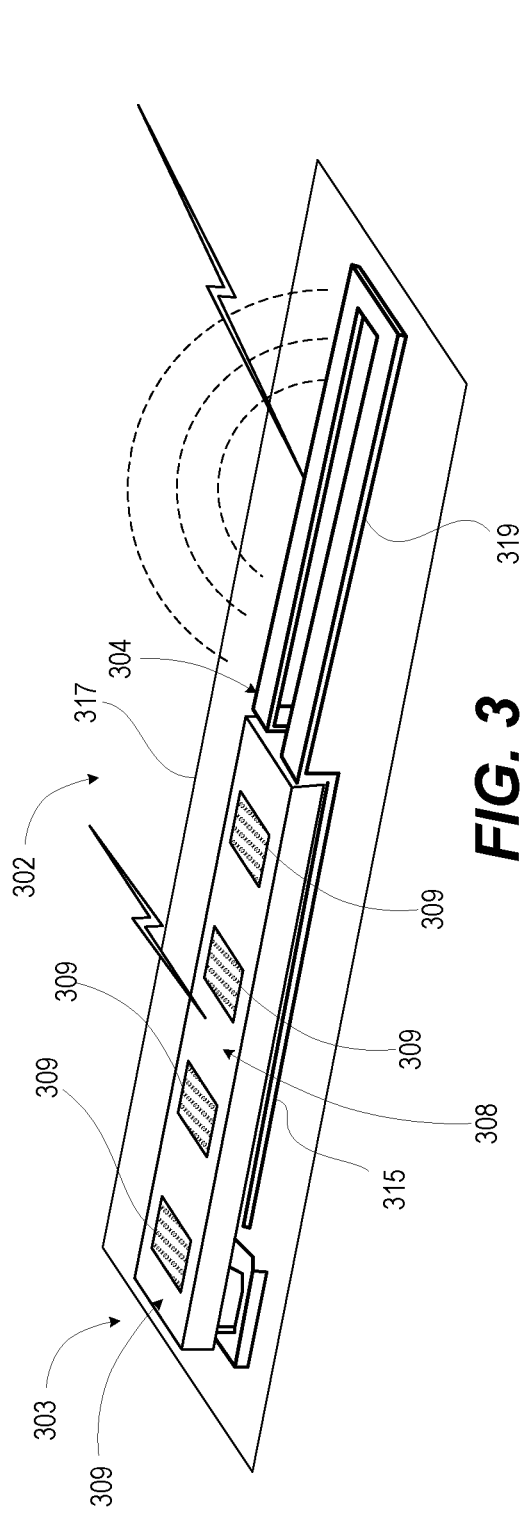
FIG. 3 is a three-dimensional view of an example dual band antenna assembly having a millimeter wave (mmWave) antenna module that is thermally cooled by an example heat sink antenna configured as a loop antenna that is utilized for sub-6 GHz communication, according to one or more embodiments.

FIG. 3 depicts a three-dimensional view of example dual band antenna assembly 302 having mmWave antenna module 303 that is thermally cooled by example heat sink antenna 304. Patch antenna array 308 of mmWave antenna module 303 has a 1×4 pattern of patch antenna elements 309. Example heat sink antenna 304 has a first portion 315 that is in thermal contact with a surface of mmWave antenna module 303, in particular the surface proximate to printed circuit board (PCB) 317. Example heat sink antenna 304 has a second portion 319 extending away from mmWave antenna module 303. Second portion 319 is configured as a loop antenna for sub-6 GHz communication. In one or more embodiments, example heat sink antenna 304 has a planar metallic structure that serves as a good heat sink for transferring thermal energy (heat) away from the mmWave antenna module 303 as a heat sink fin. In one or more embodiments, example heat sink antenna 304 is fabricated from materials having both high electrical conductivity and high thermal conductivity to support the dual functions of antenna and heat sink. For example, example heat sink antenna 304 can be fabricated from aluminum. In one or more embodiments, antenna elements are constructed of copper with thickness of approximately 200 μm for sufficient thermal conductivity. In one or more embodiments, heat sink antenna 304 is constructed of a copper-graphite laminate with the copper providing low loss antenna functionality and the graphite providing high heat spreading. The mmWave antenna module 303 is placed close to an outer shell of communication device 100 (FIG. 1). In one or more embodiments, the outer shell is plastic or glass. A minimum separation distance from mmWave module 303 to the plastic/glass surface is implemented to avoid frequency detuning/efficiency degradation. The mmWave antenna module 303 is connected to PCB 317 by flexible PCBs.

Figure 4:
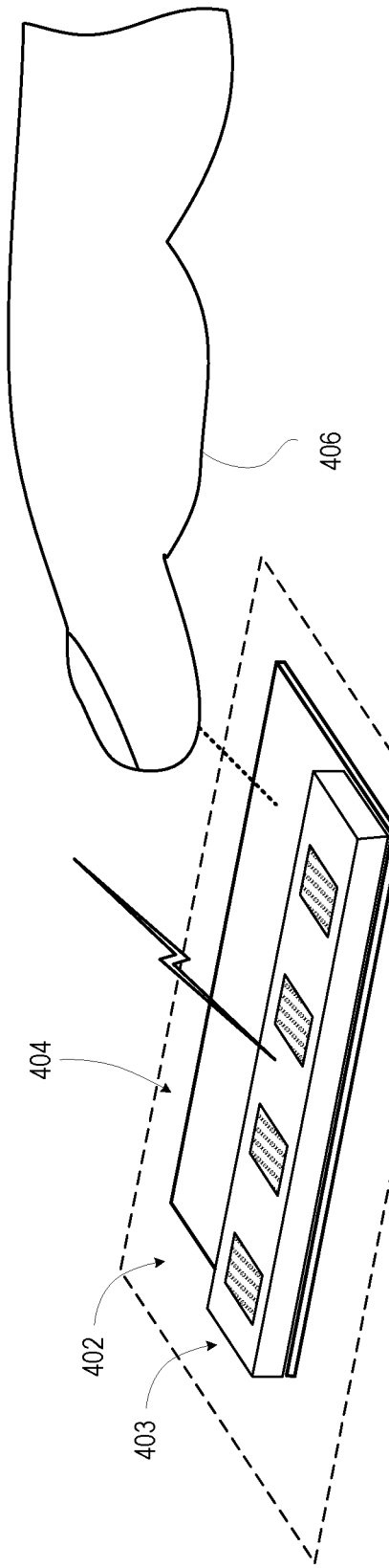
FIG. 4 is a three-dimensional view of an example dual band antenna assembly having a mmWave antenna module that is thermally cooled by an example heat sink antenna configured as a planar inverted F antenna (PIFA), which is used for human proximity detection, according to one or more embodiments.

FIG. 4 depicts a three-dimensional view of example dual band antenna assembly 402 having mmWave antenna module 403 that is thermally cooled by example heat sink antenna 404. Heat sink antenna 404 is configured as a planar inverted F antenna (PIFA) that is used for proximity detection of humans, e.g., human 406. Resonant frequencies of example heat sink antenna 404 have a longer wavelength than mmWave antenna module 403. Changes in impedance due to proximity of human 406 is detectable by heat sink antenna 404 at a correspondingly longer distance than mmWave antenna module 406. Switching of transmissions from mmWave antenna module 406 can be started in expectation of mmWave antenna module 406 being blocked or shadowed by human 406. At mmWave frequencies, transmission do not penetrate significantly into tissue. Disabling transmission does reduce a surface temperature of dual band antenna assembly 402 and provides an opportunity to gracefully transition communication to another antenna that is not blocked or shadowed.

Figure 5:
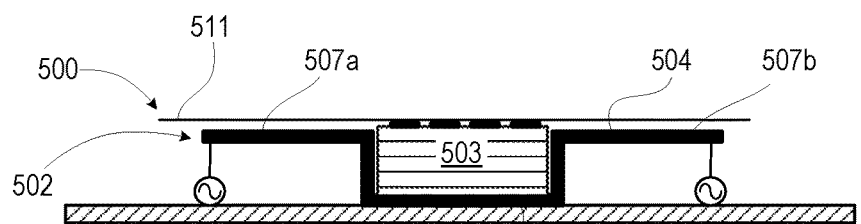
FIG. 5 is a side view of an example dual band antenna assembly having an example heat sink antenna that is configured as a sub-6 GHz loop antenna, according to one or more embodiments.

FIG. 5 is a side view of example dual band antenna assembly 502 having mmWave antenna module 503 that is in thermal conductive contact with first portion 515 of example heat sink antenna 504. Heat sink antenna 504 is in contact on the lateral sides and underside of mmWave antenna module 503. Heat sink antenna 504 is configured as a sub-6 GHz loop antenna. Second portion 507a-507b of heat sink antenna 504 extends left and right approximately co-planar with patch antenna array 508 of mmWave antenna module 503. Being close to exterior surface 511 of communication device 500 facilitates convective cooling of heat sink antenna 504. Some thermal transfer can also pass conductively to internal structure 513 of communication device 500. Internal structure 513 structurally and electrically supports dual band antenna assembly 502.

Figure 6:
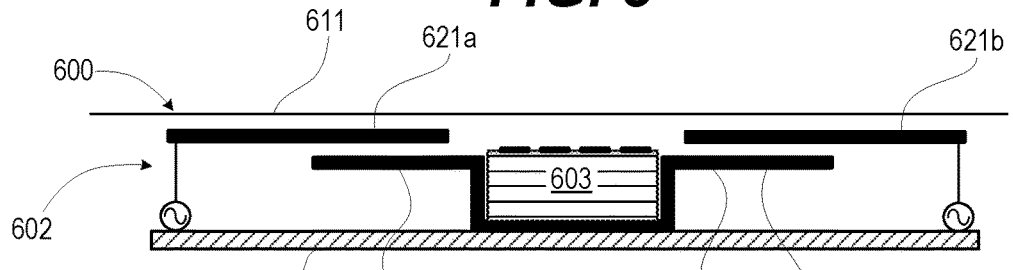
FIG. 6 is a side view of an example dual band antenna assembly having an example heat sink antenna that is configured as a capacitively coupled sub-6 GHz loop antenna, according to one or more embodiments.

FIG. 6 is a side view of example dual band antenna assembly 602 having mmWave antenna module 603 that is in thermal conductive contact with first portion 615 of example heat sink antenna 604. Heat sink antenna 604 is in contact on the lateral sides and underside of mmWave antenna module 603. Heat sink antenna 604 is configured as a capacitively coupled sub-6 GHz loop antenna that is energized via capacitive plates 621a-621b. Second portion 607a-607b of heat sink antenna 604 extends left and right approximately co-planar with patch antenna array 608 of mmWave antenna module 603. Being close to exterior surface 611 of communication device 600 facilitates convective cooling of heat sink antenna 604. Some thermal transfer can also pass conductively to internal structure 613 of communication device 600. Internal structure 613 structurally and electrically supports dual band antenna assembly 602. Some transfer of thermal energy can pass across the gap between capacitive plates 621a-621b and second portion 607a-607b respectively of heat sink antenna 604.

Figure 7:
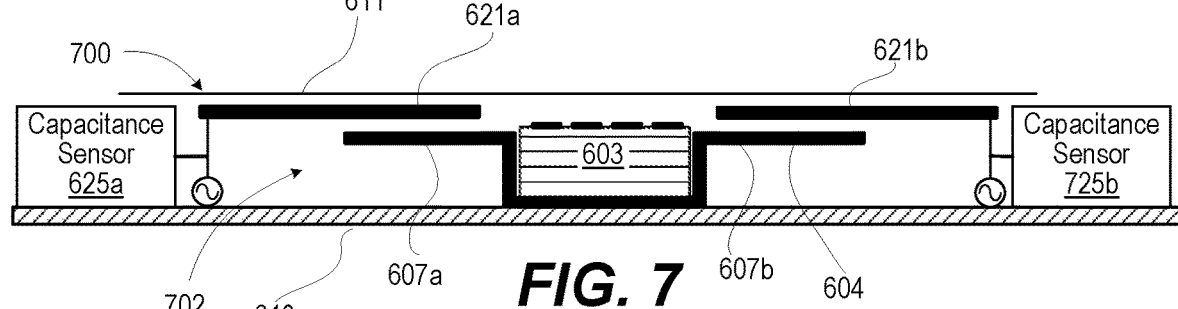
FIG. 7 is a side view of an example dual band antenna assembly having an example heat sink antenna that is configured as a capacitively coupled sub-6 GHz loop antenna with a capacitance sensor for human proximity detection, according to one or more embodiments.

FIG. 7 is a side view of example dual band antenna assembly 702 that is identical to dual band antenna assembly 602 (FIG. 6). Communication device 700 additionally has human proximity detection. In particular each of capacitive plates 621a-621b is respectively coupled to capacitance sensor 725a-725b. Capacitance sensors 725a-725b detect changes in capacitance of capacitive plates 621a-621b that occur when communication device 700 is brought close to a person.

Figure 8:
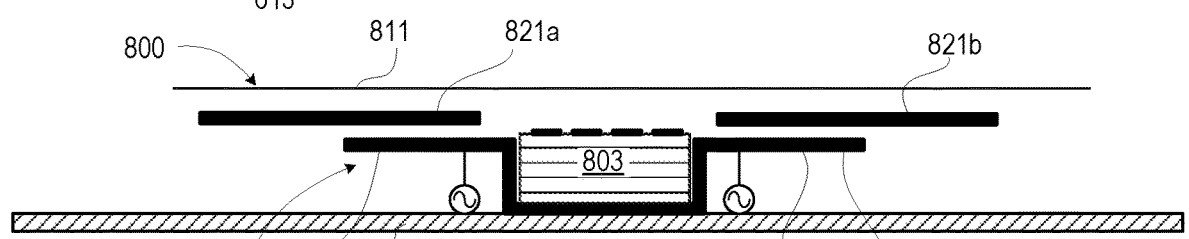
FIG. 8 is a side view of an example dual band antenna assembly having an example heat sink antenna that is configured as a capacitively coupled sub-6 GHz monopole antenna, according to one or more embodiments.

FIG. 8 is a side view of example dual band antenna assembly 802 having mmWave antenna module 803 that is in thermal conductive contact with first portion 815 of example heat sink antenna 804. Heat sink antenna 804 is in thermal contact with lateral sides and an underside of mmWave antenna module 803. Heat sink antenna 804 is configured as a capacitively coupled sub-6 GHz monopole antenna. Second portions 807a-807b of heat sink antenna 804 are energized and couple to capacitive plates 821a-821b. Second portions 807a-807b extend left and right, approximately co-planar with patch antenna array 808 of mmWave antenna module 803. Second portions 807a-807b and capacitive plates 821a-821b of heat sink antenna 804 are close to exterior surface 811 of communication device 800. Being close to exterior surface 811 of communication device 800 facilitates convective cooling of heat sink antenna 804. Some thermal transfer can also pass conductively to internal structure 813 of communication device 800. Internal structure 813 structurally and electrically supports dual band antenna assembly 802. Some transfer of thermal energy can pass across the gap between capacitive plates 821a-821b and second portion 807a-807b respectively of heat sink antenna 804.

Figure 9:
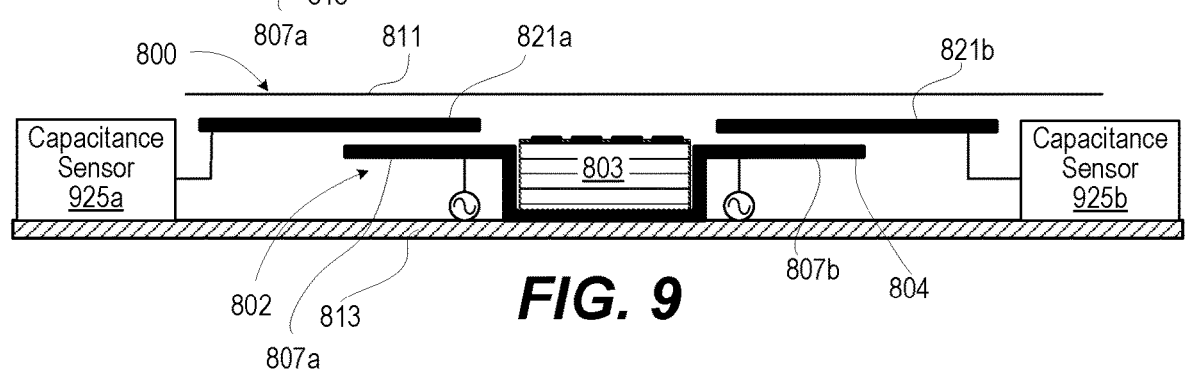
FIG. 9 is a side view of an example dual band antenna assembly having an example heat sink antenna that is configured as a capacitively coupled sub-6 GHz monopole antenna with a capacitance sensor for human proximity detection, according to one or more embodiments.

FIG. 9 is a side view of example dual band antenna assembly 902 that is identical to dual band antenna assembly 802 (FIG. 8). Communication device 900 additionally has human proximity detection. In particular, each of capacitive plates 821a-821b is respectively coupled to capacitance sensor 925a-925b. Capacitance sensors 925a-925b detect changes in capacitance of capacitive plates 821a-821b that occur when communication device 900 is brought close to a person.

Figure 10:
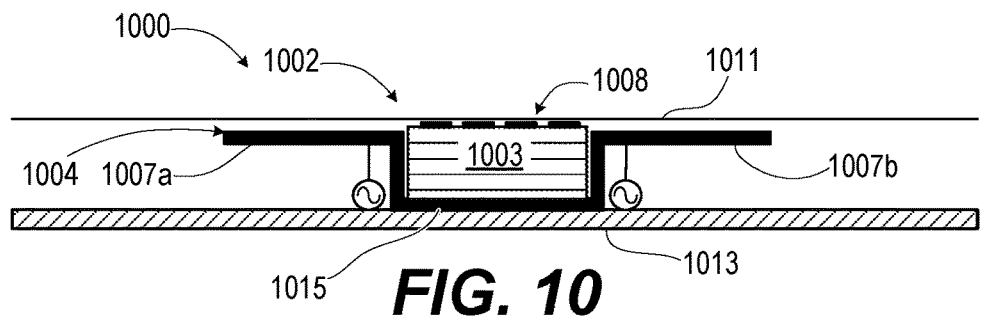
FIG. 10 is a side view of an example dual band antenna assembly having an example heat sink antenna configured as a sub-6 GHz PIFA antenna having a portion positioned close to an exterior surface of the communication device for thermal convective thermal transfer, according to one or more embodiments.

FIG. 10 is a side view of example dual band antenna assembly 1002 having mmWave antenna module 1003 that is in thermal conductive contact with first portion 1015 of example heat sink antenna 1004. Heat sink antenna 1004 is in thermal contact with lateral sides and an underside of mmWave antenna module 1003. Heat sink antenna 1004 is configured as a sub-6 GHz PIFA, which can perform satisfactorily when carried against a person, unlike other antenna configurations that do better in free space. Second portions 1007a-1007b extends left and right of as depicted mmWave antenna module 1003. Second portion 1007a-1007b are approximately co-planar with patch antenna array 1008 of mmWave antenna module 1003. Second portions 1007a-1007b of heat sink antenna 1004 are close to exterior surface 1011 of communication device 1000. Being close to exterior surface 1011 of communication device 1000 facilitates convective cooling of heat sink antenna 1004. Some thermal transfer can also pass conductively to internal structure 1013 of communication device 1000. Internal structure 1013 structurally and electrically supports dual band antenna assembly 1002.

Figure 11:
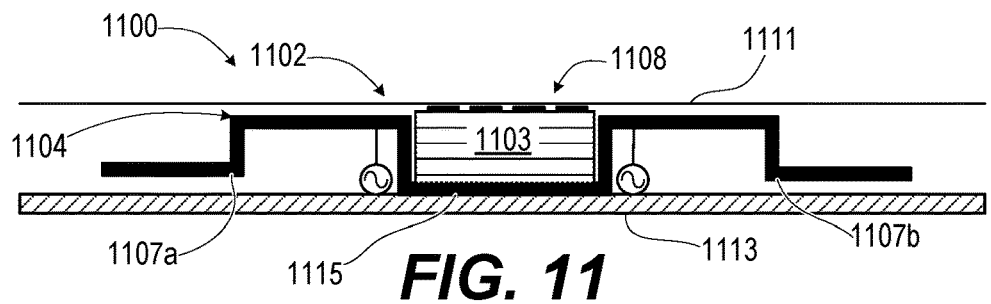
FIG. 11 is a side view of an example dual band antenna assembly having an example heat sink antenna configured as sub-6 GHz PIFA antenna with an outer portion for thermal conductive heat transfer, according to one or more embodiments.

FIG. 11 is a side view of example dual band antenna assembly 1102 having mmWave antenna module 1103 that is in thermal conductive contact with first portion 1115 of example heat sink antenna 1104. Heat sink antenna 1104 is in thermal contact with lateral sides and an underside of mmWave antenna module 1103. Heat sink antenna 1104 is configured as a sub-6 GHz PIFA. Second portion 1107a-1107b extends left and right of mmWave antenna module 1103 as depicted. Second portions 1107a-1107b are approximately co-planar with patch antenna array 1108 of mmWave antenna module 1103. Second portions 1107a-1107b of heat sink antenna 1104 are close to exterior surface 1111 of communication device 1100. Being close to exterior surface 1111 of communication device 1100 facilitates convective cooling of heat sink antenna 1104. Outward portions of second portion 1107a-1107b turn inwardly and then extend proximate to internal structure 1113. Some thermal transfer can also pass conductively to internal structure 1113 of communication device 1100. Internal structure 1113 structurally and electrically supports dual band antenna assembly 1102.

Figure 12:
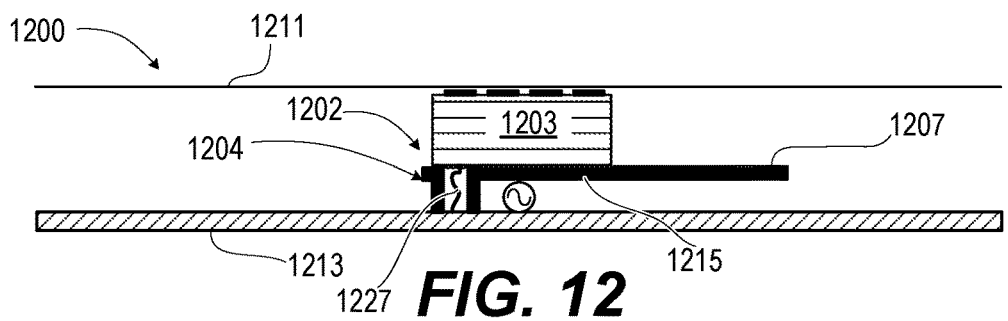
FIG. 12 is a side view of an example dual band antenna assembly with radio frequency integrated circuit (RFID) connection to a printed circuit board (PCB) and having an example heat sink antenna configured as a one-sided, low profile sub-6 GHz PIFA antenna, according to one or more embodiments.

FIG. 12 is a side view of example dual band antenna assembly 1202 having mmWave antenna module 1203 that is in thermal conductive contact with first portion 1215 of example heat sink antenna 1204. Heat sink antenna 1204 is in contact with an underside of mmWave antenna module 1203. RFIC connection 1227 electrically connects mmWave antenna module 1203 to internal structure 1213, such as a PCB. In one or more embodiments, mmWave antenna module 1203 is elevated 2-4 mm from internal structure 1213 to be close to exterior surface 1211 of communication device 1200 to achieve a desired field of view. Heat sink antenna 1204 is configured as a sub-6 GHz PIFA. Second portion 1207 extends to one side (to the right as depicted). Second portion 1207 is not close to exterior surface 1211 of communication device 1200. Thermal transfer by heat sink antenna 1204 largely passes conductively to internal structure 1213 of communication device 1200. Heatsink antenna 1204 is an example of adding an additional antenna to communication device 1200 that has limited areas of external surface 1211 that are available. First portion 1215 of heat sink antenna 1204 utilizes the space between internal structure 1213 and mmWave antenna module 1203. Second portion 1207 of heat sink antenna 1204 also extends close to internal structure 1213. In one or more embodiments, heat sink antenna 1204 can support ultra-high band (UHB) communication in n78 or n79 bands for 4G LTE communication.

Figure 13:
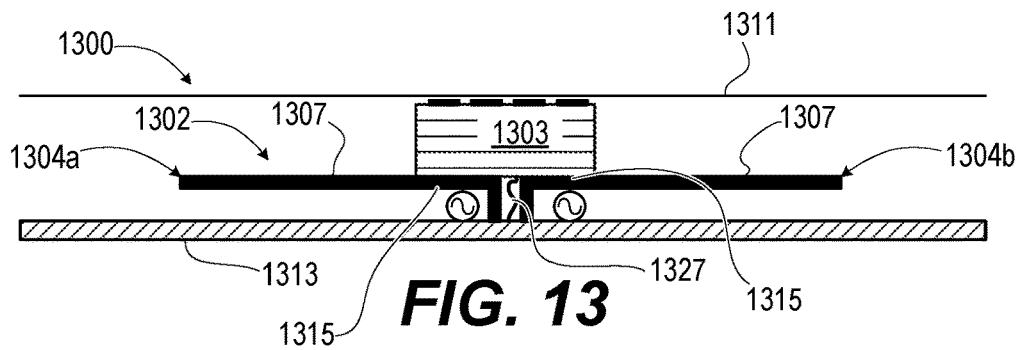
FIG. 13 is a side view of an example dual band antenna assembly with RFID connection to a PCB and having an example heat sink antenna configured as a dual low-profile sub-6 GHz PIFA antenna, according to one or more embodiments.

FIG. 13 is a side view of example dual band antenna assembly 1302 having mmWave antenna module 1303 that is in thermal conductive contact with first portion 1215 respectively of two heat sink antennas 1304a-1304b. Each heat sink antenna 1304a-1304b is in contact with a respective portion of the underside of mmWave antenna module 1303 that is spaced above internal structure 1313, such as a PCB, of communication device 1300. RFIC connection 1327 electrically connects mmWave antenna module 1303 to internal structure 1313. Each heat sink antenna 1304a-1304b is configured as a sub-6 GHz PIFA. Second portion 1307 of each heat sink antenna 1304a-1304b, respectively, extends to respective sides (to the left and right as depicted). In one or more embodiments, heat sink antenna 1304a-1304b are configured for different communication bands. In one or more embodiments, heat sink antenna 1304a-1304b are configured for the same communication band and can be transmitted with respective power amplitude and phases for antenna beam shaping.

Figure 14:
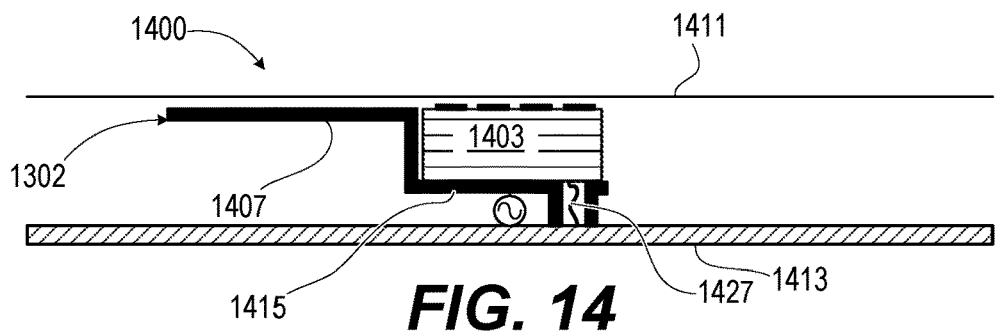
FIG. 14 is a side view of an example dual band antenna assembly with RFID connection to a PCB and having an example heat sink antenna configured as a one-sided sub-6 GHz PIFA antenna having a portion positioned close to an exterior surface of the communication device for thermal convective thermal transfer, according to one or more embodiments.

FIG. 14 is a side view of example dual band antenna assembly 1402 having mmWave antenna module 1403 that is in thermal conductive contact with first portion 1415 of example heat sink antenna 1404. Heat sink antenna 1404 is in thermal contact to an underside and one lateral side of mmWave antenna module 1403. RFIC connection 1427 electrically connects mmWave antenna module 1403 to internal structure 1413. Heat sink antenna 1404 is configured as a sub-6 GHz PIFA. Second portion 1407 extends to one side (to the left as depicted) close to exterior surface 1411 of communication device 1400, enabling thermal transfer to pass convectively from exterior surface of communication device 1400.

Figure 15:
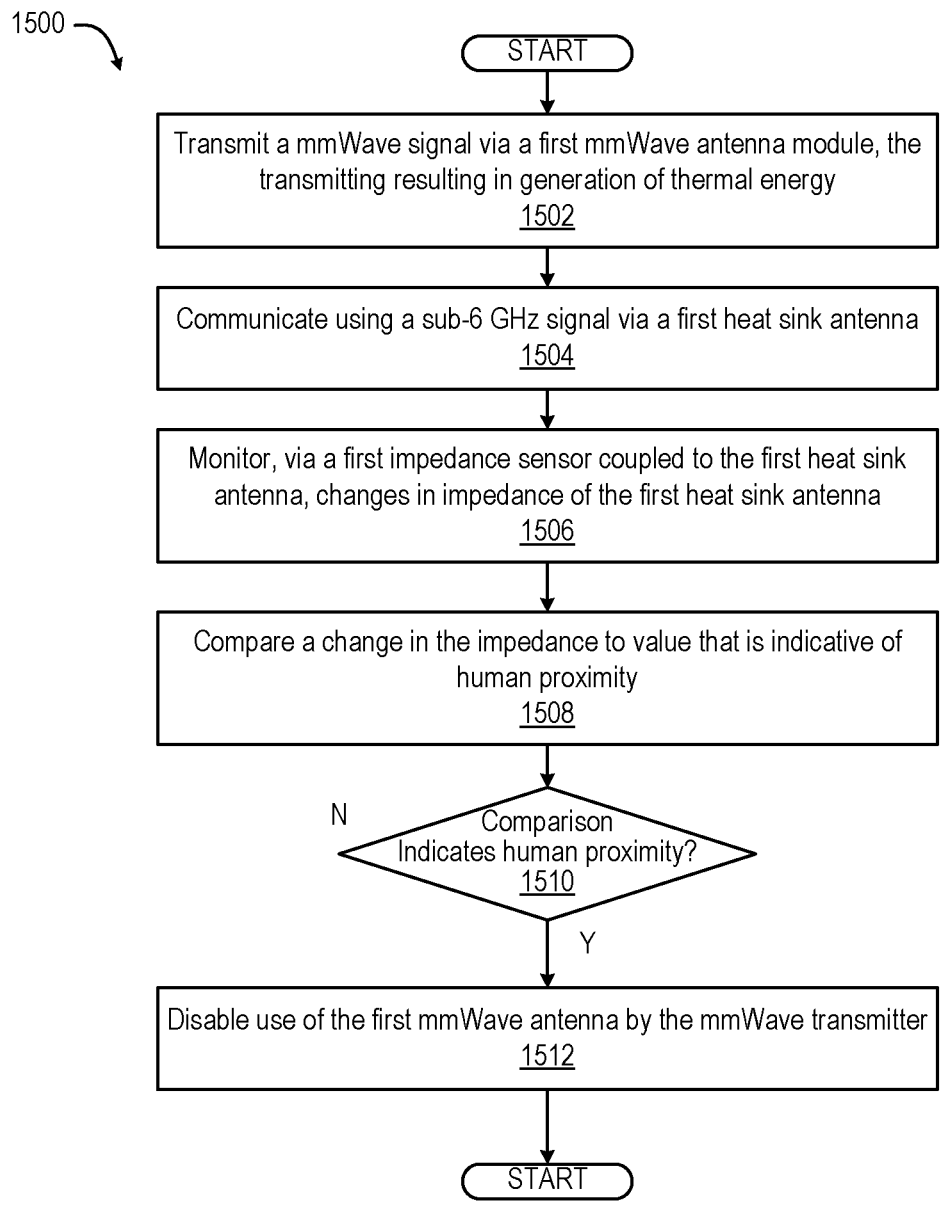
FIG. 15 presents a flow diagram of a method for dual function use of a sub-6 GHz heat sink antenna for communication and thermal energy transfer from a mmWave antenna module, according to one or more embodiments.

FIG. 15 presents a flow diagram of a method for reliably radiating a mmWave transmit signal from a communication device. In particular, the reliable transmission is enabled by use of a sub-6 GHz heat sink antenna for dual functions of communication and thermal energy transfer from a mmWave antenna module. The description of method 1500 is provided with general reference to the specific components illustrated within the preceding FIGS. 1-14. In at least one embodiment, method 1500 can be performed using antenna subsystem 111 of communication device 100, managed by controller 101 (FIG. 1). Specific component described in method 1500 can be identical or similar to specific components of the same name used to describe preceding FIGS. 1-14.

With reference to FIG. 15, method 1500 includes transmitting a mmWave signal via a first mmWave antenna module, the transmitting resulting in generation of thermal energy (block 1502). Method 1500 includes communicating using a sub-6 GHz signal via a first heat sink antenna (FIG. 1504). The first heat sink antenna has a first portion in thermal conductive contact with at least a portion of a surface of the first mmWave antenna module. The first heat sink antenna has a second portion extending away from the first mmWave antenna module to transfer the thermal energy away from the first mmWave antenna module. Method 1500 includes monitoring, via a first impedance sensor coupled to the first heat sink antenna, changes in impedance of the first heat sink antenna (block 1506). Method 1500 includes comparing a change in the impedance to a value that is indicative of human proximity (block 1508). A determination is made, in decision block 1510, whether the comparison indicates human proximity. In response to determining that the comparison does not indicate human proximity, then method 1500 returns to block 1502. In response to determining that the comparison does indicate human proximity, then method 1500 includes disabling use of the first mmWave antenna by the mmWave transmitter (block 1512). Then method 1500 ends.

Figure 16A:
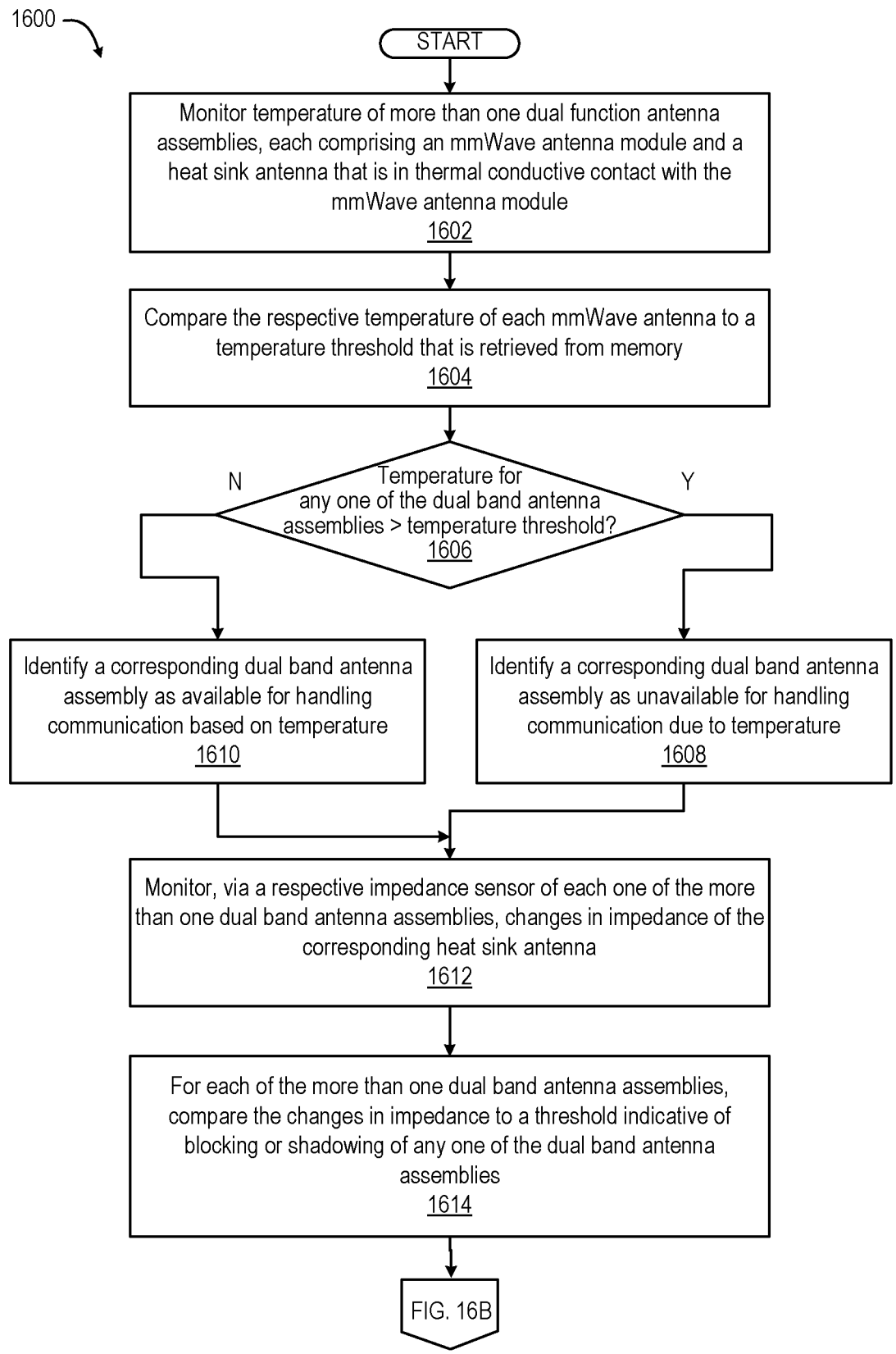
FIGS. 16A-16B (FIG. 16) present a flow diagram of a method for reliably radiating a mmWave transmit signal from a communication device using multiple dual band antenna assemblies that mitigate thermal loads and detect shadowing that blocks transmission, according to one or more embodiments.
Figure 16B:
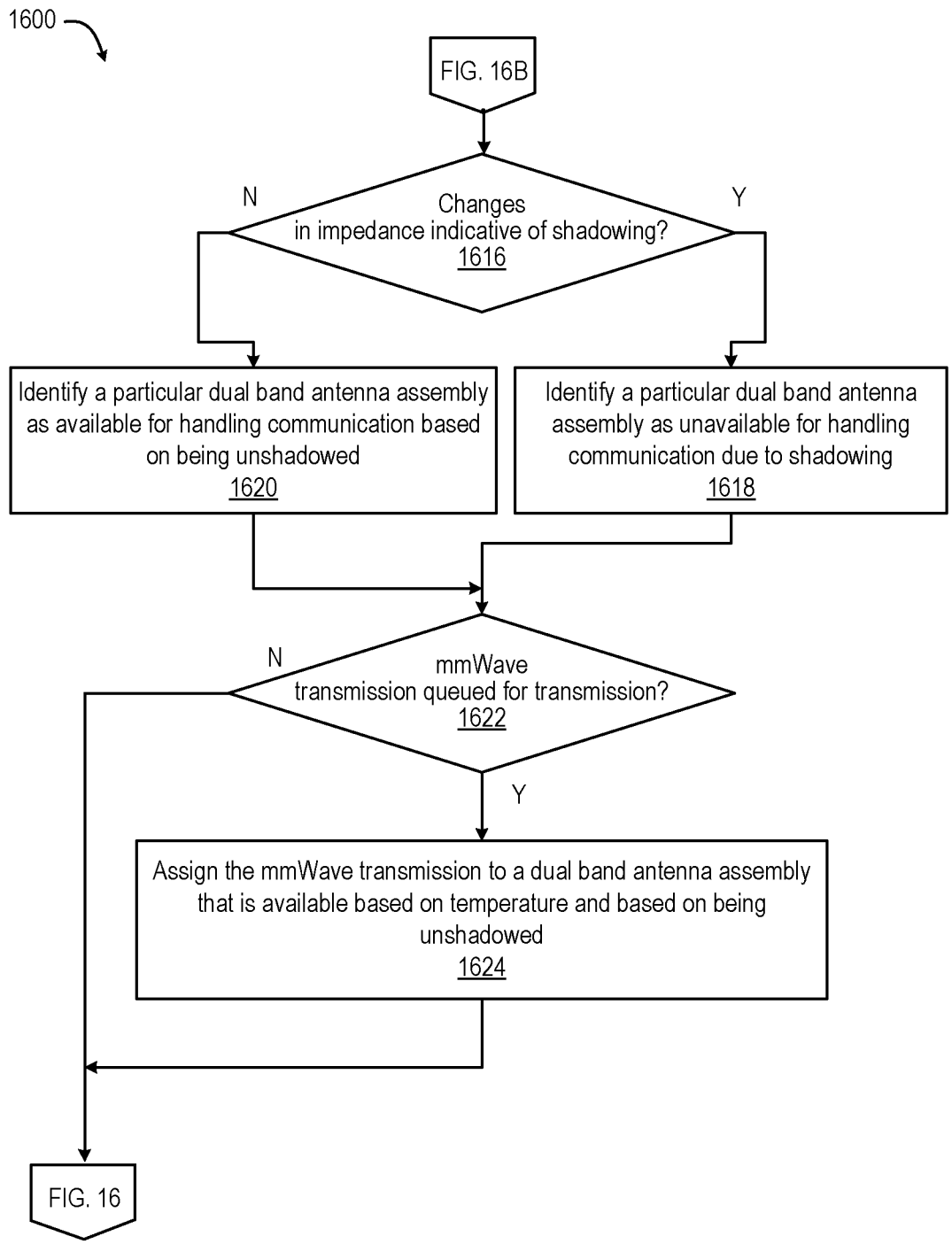

FIGS. 16A-16B (FIG. 16) present a flow diagram of a method for reliably radiating a mmWave transmit signal from a communication device having multiple dual band antenna assemblies. In particular, the reliable transmission is enabled by use of a sub-6 GHz heat sink antenna for the dual functions of communication and thermal energy transfer from a mmWave antenna module. The description of method 1600 is provided with general reference to the specific components illustrated within the preceding FIGS. 1-14. In at least one embodiment, method 1600 can be performed using antenna subsystem 111 of communication device 100, managed by controller 101 (FIG. 1). Specific components described in method 1600 can be identical or similar to specific components of the same name used to describe preceding FIGS. 1-16.

With reference to FIG. 16A, method 1600 includes monitoring temperature of more than one dual function antenna assemblies, each antenna assembly comprising an mmWave antenna module and a heat sink antenna that is in thermal conductive contact with the mmWave antenna module (block 1602). Method 1600 includes comparing the respective temperature of each mmWave antenna to a temperature threshold that is retrieved from memory (block 1604). A determination is made, in decision block 1606, whether the respective temperature is greater than the temperature threshold for any one of the dual band antenna assemblies. In response to determining that the respective temperature is greater than the temperature threshold for any one of the dual band antenna assemblies, method 1600 includes identifying a corresponding dual band antenna assembly as unavailable due to temperature (block 1608). In response to determining that the respective temperature is less than or equal to the temperature threshold for any one of the dual band antenna assemblies, method 1600 includes identifying a corresponding dual band antenna assembly as available for handling communication based on temperature (block 1610).

After either block 1608 or block 1610, method 1600 includes monitoring, via a respective impedance sensor of each one of the more than one dual band antenna assemblies, changes in impedance of the corresponding heat sink antenna (block 1612). For each of the more than one dual band antenna assemblies, method 1600 includes comparing the changes in impedance to a threshold indicative of blocking or shadowing of any one of the dual band antenna assemblies (block 1614).

With reference to FIG. 16B, a determination is made, in decision block 1616, whether the changes in impedance is indicative of shadowing. In response to determining that the change in impedance is indicative of blocking or shadowing of any one of the dual band antenna assemblies, method 1600 includes identifying a particular dual band antenna assembly as unavailable due to shadowing (block 1618). In response to determining that the change in impedance is not indicative of blocking or shadowing of any one of the dual band antenna assemblies, method 1600 includes identifying a particular dual band antenna assembly as available based on being unshadowed (block 1620). After either block 1618 or block 1620, a determination is made, in decision block 1622, whether a mmWave transmission is queued for transmission. In response to determining that a mmWave transmission is not queued for transmission, method 1600 returns to block 1602 (FIG. 16A). In response to determining that a mmWave transmission is queued for transmission, method 1600 includes assigning the mmWave transmission to a dual band antenna assembly that is available based on temperature and based on being unshadowed (block 1620). Then method 1600 returns to block 1602 (FIG. 16A).

In the above described flow charts presented herein, certain steps of the methods can be combined, performed simultaneously or in a different order, or perhaps omitted, without deviating from the spirit and scope of the described innovation. While the method steps are described and illustrated in a particular sequence, use of a specific sequence of steps is not meant to imply any limitations on the innovation. Changes may be made with regards to the sequence of steps without departing from the spirit or scope of the present innovation. Use of a particular sequence is therefore, not to be taken in a limiting sense, and the scope of the present innovation is defined only by the appended claims.

Aspects of the present innovation are described above with reference to flowchart illustrations and/or block diagrams of methods, apparatus (systems) and computer program products according to embodiments of the innovation. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

As will be appreciated by one skilled in the art, embodiments of the present innovation may be embodied as a system, device, and/or method. Accordingly, embodiments of the present innovation may take the form of an entirely hardware embodiment or an embodiment combining software and hardware embodiments that may all generally be referred to herein as a "circuit," "module" or "system."

While the innovation has been described with reference to exemplary embodiments, it will be understood by those skilled in the art that various changes may be made, and equivalents may be substituted for elements thereof without departing from the scope of the innovation. In addition, many modifications may be made to adapt a particular system, device, or component thereof to the teachings of the innovation without departing from the essential scope thereof. Therefore, it is intended that the innovation not be limited to the particular embodiments disclosed for carrying out this innovation, but that the innovation will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the innovation. As used herein, the singular forms "a", "an" and "the" are intended to include the plural forms as well, unless the context clearly indicates otherwise. It will be further understood that the terms "comprise" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present innovation has been presented for purposes of illustration and description but is not intended to be exhaustive or limited to the innovation in the form disclosed. Many modifications and variations will be apparent to those of ordinary skill in the art without departing from the scope and spirit of the innovation. The embodiments were chosen and described in order to best explain the principles of the innovation and the practical application, and to enable others of ordinary skill in the art to understand the innovation for various embodiments with various modifications as are suited to the particular use contemplated.

What is claimed is:

1. A communication device comprising:
a first millimeter wave (mmWave) antenna module;
a first heat sink antenna having a first portion in thermal conductive contact with at least a portion of a surface of the first mmWave antenna module and having a second portion extending away from the first mmWave antenna module to transfer thermal energy away from the first mmWave antenna module, the first heat sink antenna configured as a capacitively coupled sub-6 GHz antenna for communication, with a capacitance sensor for human proximity detection; and
a radio frequency (RF) front end comprising a mmWave transmitter that radiates a mmWave signal via the first mmWave antenna module, resulting in generation of the thermal energy, the RF front end further comprising a sub-6 GHz transmitter that radiates a sub-6 GHz signal via the first heat sink antenna.

2. The communication device of claim 1, wherein the first heat sink antenna operates as a heat sink for the first mmWave antenna module and is configured as one of: (i) a loop antenna; (ii) a capacitively coupled loop antenna; (iii) a planar inverted-F antenna (PIFA); and (iv) a capacitively coupled monopole antenna.

3. The communication device of claim 1, wherein the first heat sink antenna comprises a copper structure having a thickness of at least 200 μm for thermal and electrical conduction.

4. The communication device of claim 1, wherein the first heat sink antenna comprises a copper-graphite laminate structure.

5. The communication device of claim 1, further comprising:
a first impedance sensor that is communicatively coupled to the first heat sink antenna; and
a controller that is communicatively coupled to the first impedance sensor and which:
monitors, via the first impedance sensor, changes in impedance of the first heat sink antenna;
determines, based on the changes in impedance, whether a human is blocking the first mmWave antenna module; and
disables use of the first mmWave antenna module by the mmWave transmitter in response to determining that the human is blocking the first mmWave antenna module.

6. The communication device of claim 1, further comprising:
a controller; and
more than one dual band assemblies that are each communicatively coupled to the controller and each comprise a corresponding combination of a mmWave antenna, a heat sink antenna, and an impedance sensor;
wherein:
the first mmWave antenna, the first heat sink antenna, and the first impedance sensor comprise a first dual band antenna assembly;
each mmWave antenna respectively of the more than one dual band antenna assemblies comprises a temperature management component, wherein; and
the controller:
monitors a respective temperature of each mmWave antenna of the more than one dual band antenna assemblies;
compares the respective temperature of each mmWave antenna to a temperature threshold; and
in response to the respective temperature being greater than the temperature threshold for any one of the dual band antenna assemblies, identifies a corresponding dual band antenna assembly as unavailable.

7. The communication device of claim 6, further comprising:
a first impedance sensor that is communicatively coupled to the first heat sink antenna; and
wherein the controller:
monitors, via a respective impedance sensor of each one of the more than one dual band antenna assemblies, changes in impedance of the corresponding heat sink antenna;
for each of the more than one dual band antenna assemblies, identifies a particular dual band antenna assembly as unavailable in response to determining, based on the changes in impedance via the corresponding impedance sensor, that a human is blocking the corresponding mmWave antenna; and
in response to determining that the human is blocking the mmWave antenna of the first dual band antenna assembly, switches the mmWave transmitter to an available mmWave antenna having a temperature that is less than or equal to the temperature threshold and is not blocked by a human.

8. The communication device of claim 1, wherein the first heat sink antenna has a planar metallic structure.

9. The communication device of claim 1, wherein the first heat sink antenna is fabricated from materials having both high electrical conductivity and high thermal conductivity to support dual functions of an antenna and a heat sink.

10. A method for reliably radiating a millimeter wave (mmWave) transmit signal from a communication device, the method comprising:
transmitting a mmWave signal via a first mmWave antenna module that is in thermal conductive contact with a first heat sink antenna, the transmitting resulting in generation of thermal energy, wherein the first heat sink antenna is configured as a sub-6 GHz antenna for communication, with a capacitance sensor for human proximity detection; and
communicating using a sub-6 GHz signal via the first heat sink antenna that has a first portion in thermal conductive contact with at least a portion of a surface of the first mmWave antenna module and a second portion extending away from the first mmWave antenna module to transfer the thermal energy away from the first mmWave antenna module.

11. The method of claim 10, further comprising:
monitoring, via a first impedance sensor coupled to the first heat sink antenna, changes in impedance of the first heat sink antenna;
determining, based on the changes in impedance, whether a human is blocking the first mmWave antenna module; and
disabling use of the first mmWave antenna by the mmWave transmitter, in response to determining that the human is blocking the first mmWave antenna.

12. The method of claim 10, further comprising transmitting the sub-6 GHz signal via the first heat sink antenna, the first heat sink antenna providing thermal energy transfer away from the first mmWave antenna module and being configured as one of: (i) a loop antenna; (ii) a capacitively coupled loop antenna; (iii) a planar inverted-F antenna (PIFA); and (iv) a capacitively coupled monopole antenna.

13. The method of claim 10, wherein the first mmWave antenna module, the first heat sink antenna, and the first impedance sensor comprise a first dual band antenna assembly of more than one dual band antenna assemblies within the communication device, the method further comprising:
monitoring a respective temperature of each mmWave antenna of the more than one dual band antenna assemblies;
comparing the respective temperature of each mmWave antenna to a temperature threshold; and
in response to the respective temperature being greater than the temperature threshold for any one of the dual band antenna assemblies, identifying a corresponding dual band antenna assembly as unavailable.

14. The method of claim 13, further comprising:
monitoring, via a respective impedance sensor of each one of the more than one dual band antenna assemblies, changes in impedance of the corresponding heat sink antenna;
for each of the more than one dual band antenna assemblies, identifying a particular dual band antenna assembly as unavailable in response to determining, based on the changes in impedance via the corresponding impedance sensor, that a human is blocking the corresponding mmWave antenna; and switching the mmWave transmitter to a mmWave antenna that is available based on both having a temperature that is less than or equal to the temperature threshold and is not blocked by a human in response to determining that the human is blocking the mmWave antenna of the first dual band antenna assembly.

15. A computer program product comprising:

a computer readable storage device; and program code on the computer readable storage device that when executed by a processor associated with a communication device, the program code enables the communication device to provide the functionality of:

transmitting a mmWave signal via a first mmWave antenna module that is in thermal conductive contact with a first heat sink antenna, the transmitting resulting in generation of thermal energy, wherein the first heat sink antenna is configured as an antenna for sub-6 GHz communication, with a capacitance sensor for human proximity detection; and communicating using a sub-6 GHz signal via the first heat sink antenna that has a first portion in thermal conductive contact with at least a portion of a surface of the first mmWave antenna module and a second portion extending away from the first mmWave antenna module to transfer the thermal energy away from the first mmWave antenna module, the first heat sink antenna configured to support sub-6 GHz communication.

16. The computer program product of claim 15, wherein the program code enables the communication device to provide the functionality of:

monitoring, via a first impedance sensor coupled to the first heat sink antenna, changes in impedance of the first heat sink antenna;

determining, based on the changes in impedance, whether a human is blocking the first mmWave antenna module; and— disabling use of the first mmWave antenna by the mmWave transmitter, in response to determining that the human is blocking the first mmWave antenna module.

17. The computer program product of claim 15, wherein the program code enables the communication device to provide the functionality of transmitting the sub-6 GHZ signal via the first heat sink antenna, the first heat sink antenna providing thermal energy transfer away from the first mmWave antenna and being configured as one of: (i) a loop antenna; (ii) a capacitively coupled loop antenna; (iii) a planar inverted-F antenna (PIFA); and (iv) a capacitively coupled monopole antenna.

18. The computer program product of claim 15, wherein the first mmWave antenna module, the first heat sink antenna, and the first impedance sensor comprise a first dual band antenna assembly of more than one dual band antenna assemblies of the communication device, the program code enables the communication device to provide the functionality of:

monitoring a respective temperature of each mmWave antenna of the more than one dual band antenna assemblies;

comparing the respective temperature of each mmWave antenna to a temperature threshold; and in response to the respective temperature being greater than the temperature threshold for any one of the dual band antenna assemblies, identifying a corresponding dual band antenna assembly as unavailable.

19. The computer program product of claim 18, wherein the program code enables the communication device to provide the functionality of:

monitoring, via a respective impedance sensor of each one of the more than one dual band antenna assemblies, changes in impedance of the corresponding heat sink antenna;

for each of the more than one dual band antenna assemblies, identifying a particular dual band antenna assembly as unavailable in response to determining, based on the changes in impedance via the corresponding impedance sensor, that a human is blocking the corresponding mmWave antenna; and switching the mmWave transmitter to a mmWave antenna that is available based on both having a temperature that is less than or equal to the temperature threshold and is not blocked by a human in response to determining that the human is blocking the mmWave antenna of the first dual band antenna assembly.

* * * * *